(12) United States Patent
Noro et al.

(10) Patent No.: US 6,430,949 B2
(45) Date of Patent: Aug. 13, 2002

(54) HEAT-PUMP WATER HEATER

(75) Inventors: Shinya Noro, Kariya; Hisayoshi Sakakibara, Nishio; Jyouji Kuroki, Kariya; Tomoaki Kobayakawa, Tokyo; Kazutoshi Kusakari, Urawa; Michiyuki Saikawa, Zushi, all of (JP)

(73) Assignees: Denso Corporation, Kariya; Tokyo Electric Power Company; Central Research Institute of Electric Power Industry, both of Tokyo, all of (JP)

( * ) Notice: Subject to any disclaimer, the term of this patent is extended or adjusted under 35 U.S.C. 154(b) by 0 days.

(21) Appl. No.: 09/837,107

(22) Filed: Apr. 18, 2001

(30) Foreign Application Priority Data

Apr. 19, 2000 (JP) .......................................... 2000-118394
Oct. 11, 2000 (JP) .......................................... 2000-311142

(51) Int. Cl.[7] .............................................. F25B 39/04
(52) U.S. Cl. ........................................................ 62/183
(58) Field of Search ........................ 62/183, 184, 238.6, 62/223

(56) References Cited

U.S. PATENT DOCUMENTS

| | | | |
|---|---|---|---|
| 4,620,424 A | | 11/1986 | Tanaka et al. |
| 4,680,941 A | * | 7/1987 | Richardson et al. .......... 62/184 |
| 4,878,355 A | | 11/1989 | Beckey et al. |
| 4,955,207 A | * | 9/1990 | Mink .......................... 62/238.6 |
| 5,641,016 A | * | 6/1997 | Isaji et al. .................... 165/43 |
| 5,669,231 A | * | 9/1997 | Itoh et al. ..................... 62/210 |
| 5,799,867 A | * | 9/1998 | Misawa .......................... 237/2 |
| 5,927,087 A | * | 7/1999 | Ishikawa ....................... 62/174 |

FOREIGN PATENT DOCUMENTS

| | | |
|---|---|---|
| DE | 19955339 A1 | 5/2000 |
| DE | 10043169 A1 | 4/2001 |
| EP | 0 443 099 A2 | 8/1991 |
| EP | 0 762 064 A1 | 3/1997 |
| EP | 0 866 291 A1 | 9/1998 |
| EP | 1134518 A2 | 9/2001 |
| FR | 2 539 855 | 7/1984 |
| JP | U6-73652 | 10/1994 |

* cited by examiner

Primary Examiner—William Doerrler
Assistant Examiner—Malik N. Drake
(74) Attorney, Agent, or Firm—Harness, Dickey & Pierce, PLC

(57) ABSTRACT

In a heat-pump water heater, an ECU sets a target temperature difference between water flowing into a water heat exchanger and refrigerant flowing out from the water heat exchanger, and controls a valve opening degree of an expansion valve so that the target temperature difference is obtained. When a refrigerant temperature discharged from a compressor is higher than a predetermined value, the target temperature difference is increased until the refrigerant temperature discharged from the compressor becomes lower than the predetermined value. Further, when water-heating capacity is decreased due to the increase of the target temperature difference, a rotation speed of the compressor is increased.

20 Claims, 7 Drawing Sheets

HEAT-PUMP WATER HEATER

CROSS-REFERENCE TO RELATED APPLICATION

This application is related to Japanese Patent Applications No. 2000-118394 filed on Apr. 19, 2000, and No. 2000-311142 filed on Oct. 11, 2000, the contents of which are hereby incorporated by reference.

BACKGROUND OF THE INVENTION

1. Field of the Invention

The present invention relates to a heat-pump water heater that heats water using a super-critical (transcritical) heat pump cycle as a heating source.

2. Description of Related Art

In a conventional heat-pump water heater, low-temperature water is heat-exchanged with high-temperature refrigerant in a water heat exchanger, and high-temperature water heated in the water heat exchanger is stored in a water tank to be supplied to a user after being temperature-adjusted. In the heat-pump water heater, a target temperature difference ΔT between water flowing into the water heat exchanger and refrigerant discharged from the water heat exchanger is set, and high-pressure side refrigerant pressure of the heat pump cycle is controlled based on the target temperature difference ΔT for increasing a cycle efficiency of the heat pump cycle. Generally, the high-pressure side refrigerant pressure is controlled by adjusting a valve opening degree of the expansion valve.

However, when the high-pressure side refrigerant pressure is controlled based on the target temperature difference ΔT when the heat-pump water heater is used under a low temperature, a low-pressure side refrigerant pressure (e.g., evaporation pressure) of the heat pump cycle is decreased, and temperature of refrigerant discharged from a compressor may exceed a normal operation temperature area of the compressor.

On the other hand, when the high-pressure side refrigerant pressure of the heat pump cycle is increased due to an outside air increase, a water temperature increase, a rotation speed increase of the compressor or a deterioration of operation performance of the water heat exchanger, load of the compressor increases, and a normal operation of the heat pump cycle may be affected. In this case, when the rotation speed of the compressor is decreased for preventing the overload of the compressor, it is difficult to obtain a necessary heating capacity in the water heater only by controlling the valve opening degree of the expansion valve.

SUMMARY OF THE INVENTION

In view of the foregoing problems, it is an object of the present invention to provide a heat-pump fluid heater for heating a fluid (e.g., water) using a heat pump cycle as a heating source, in which a refrigerant temperature discharged from a compressor can be controlled in an operation temperature area even when the heat pump cycle is used under a low temperature.

It is an another object of the present invention to provide a heat-pump fluid heater which prevents a problem of a heat pump cycle due to a load increase of a compressor, while obtaining a desired water-heating capacity in a water supply system.

According to the present invention, in a heat pump fluid heater for heating a fluid (e.g., water) using a heat pump cycle as a heating source, a control unit for controlling operation of the heat pump cycle controls a high-pressure side refrigerant pressure from the compressor and before being decompressed in the heat pump cycle, so that a temperature difference between the fluid flowing into a heat exchanger and refrigerant discharged from the heat exchanger becomes a set target temperature difference. Further, the control unit has a detection member for detecting one of a refrigerant temperature and a physical amount relative to the refrigerant temperature discharged from the compressor, and the control unit changes the target temperature difference to be increased when a detection value of the detection member is more than a predetermined value. When the target temperature difference is changed and becomes larger, a heat-exchanging efficiency of the heat exchanger is decreased, and a heat-exchanging amount in the heat exchanger is reduced. That is, in this case, because the refrigerant pressure discharged from the compressor is controlled to be decreased, the refrigerant temperature discharged from the compressor is decreased. Accordingly, even when the heat pump cycle is used under a low temperature condition, the refrigerant temperature discharged from the compressor can be controlled in an operation temperature area.

Preferably, the control unit sets the target temperature difference larger as a low-pressure side refrigerant pressure after being decompressed in the heat pump cycle becomes lower, when the low-pressure side refrigerant pressure in the heat pump cycle is lower than a predetermined pressure. When the low-pressure side refrigerant pressure (e.g., evaporation pressure) of the heat pump cycle is decreased due to a decrease of outside air temperature, for example, load of the compressor is increased and refrigerant temperature discharged from the compressor is increased. Accordingly, by setting the target temperature difference larger as the low-pressure side refrigerant pressure becomes lower, it can effectively restrict the refrigerant temperature discharged from the compressor from being increased.

On the other hand, the control unit determines whether or not a load of the compressor is excessive, and the control unit changes the target temperature difference to be increased to a value when it is determined that the load of the compressor is excessive. In this case, when the target temperature difference is made larger, the compressor continuously operates with a relatively lower high-pressure. Accordingly, is can prevent a problem of a heat pump cycle due to an increased load of the compressor. Further, when the fluid is water in a hot water supply system, a desired water-heating capacity can be obtained.

According to the present invention, the control unit has a temperature detection sensor for detecting a refrigerant temperature discharged from the compressor, and the control unit controls a high-pressure side refrigerant pressure from the compressor and before being decompressed in the heat pump cycle, so that a temperature difference between the fluid flowing into the heat exchanger and refrigerant discharged from the heat exchanger becomes a target temperature difference when the refrigerant temperature detected by the temperature sensor is lower than a predetermined temperature. On the other hand, when the refrigerant temperature detected by the temperature sensor is higher than the predetermined temperature, the control unit controls the high-pressure side refrigerant pressure of the heat pump cycle so that the refrigerant temperature detected by the temperature sensor becomes lower than the predetermined temperature. Accordingly, the refrigerant temperature discharged from the compressor can be directly controlled without changing the target temperature difference.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention will be described hereinafter with reference to the accompanying drawings.

Figure 1:
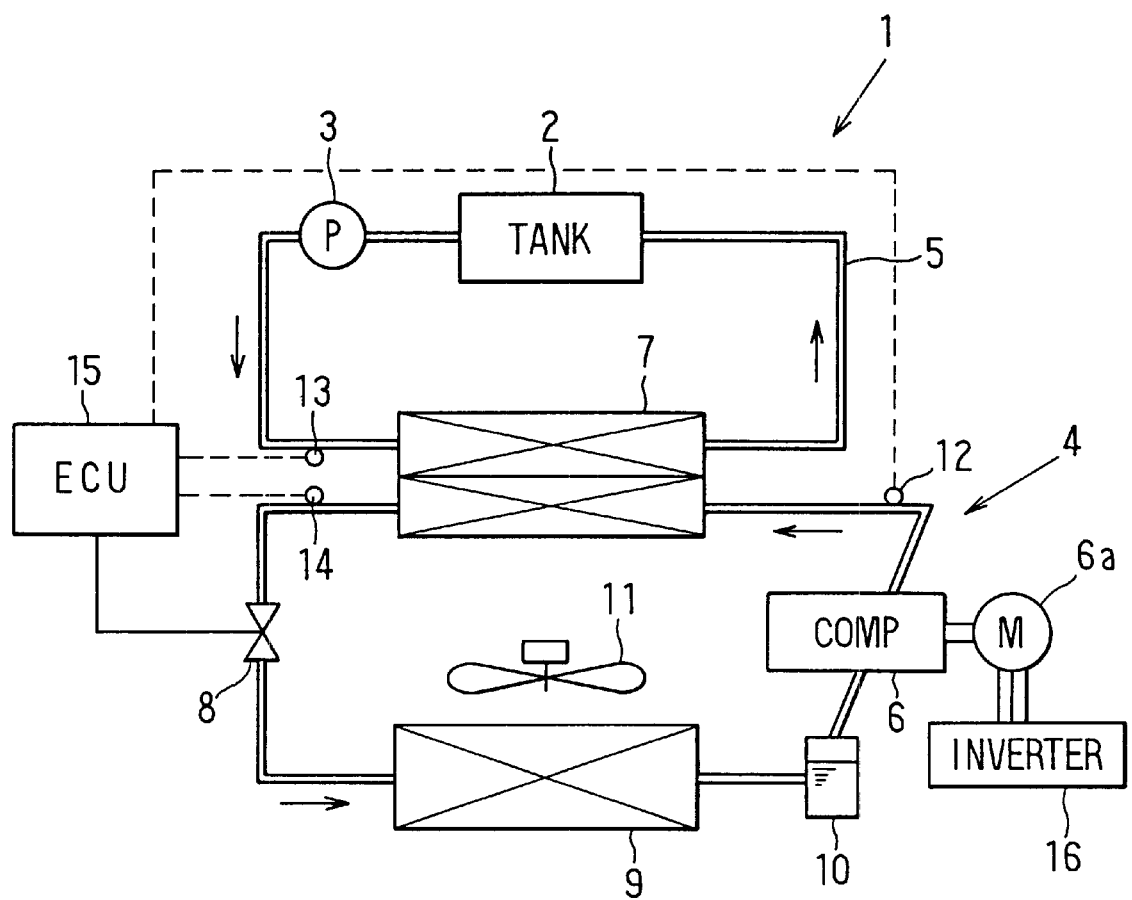
FIG. 1 is a schematic diagram of a heat-pump water heater according to a first preferred embodiment of the present invention.
Figure 2:
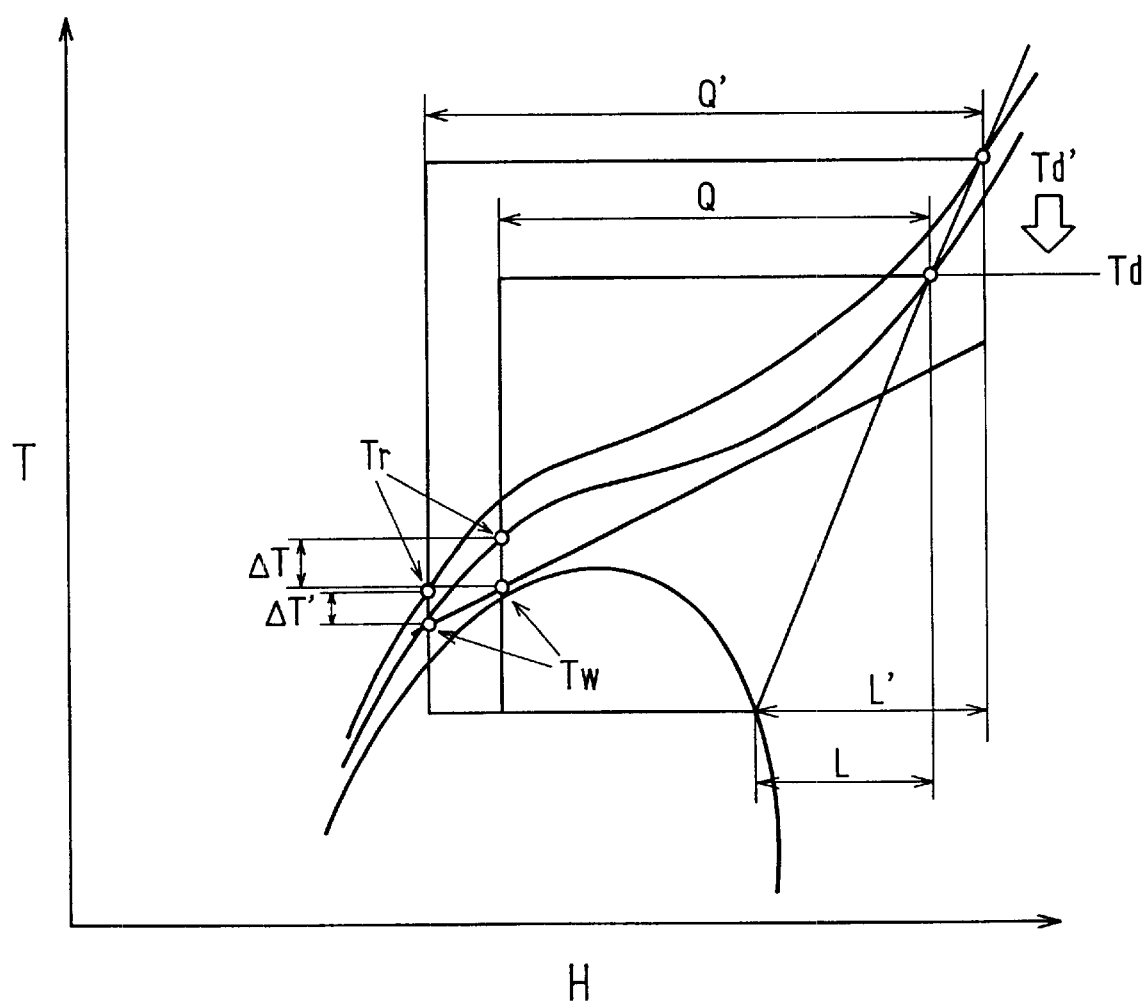
FIG. 2 is a graph (T–H diagram) showing a relationship between temperature and enthalpy in a heat pump cycle using carbon dioxide as refrigerant, according to the first embodiment.
Figure 3:
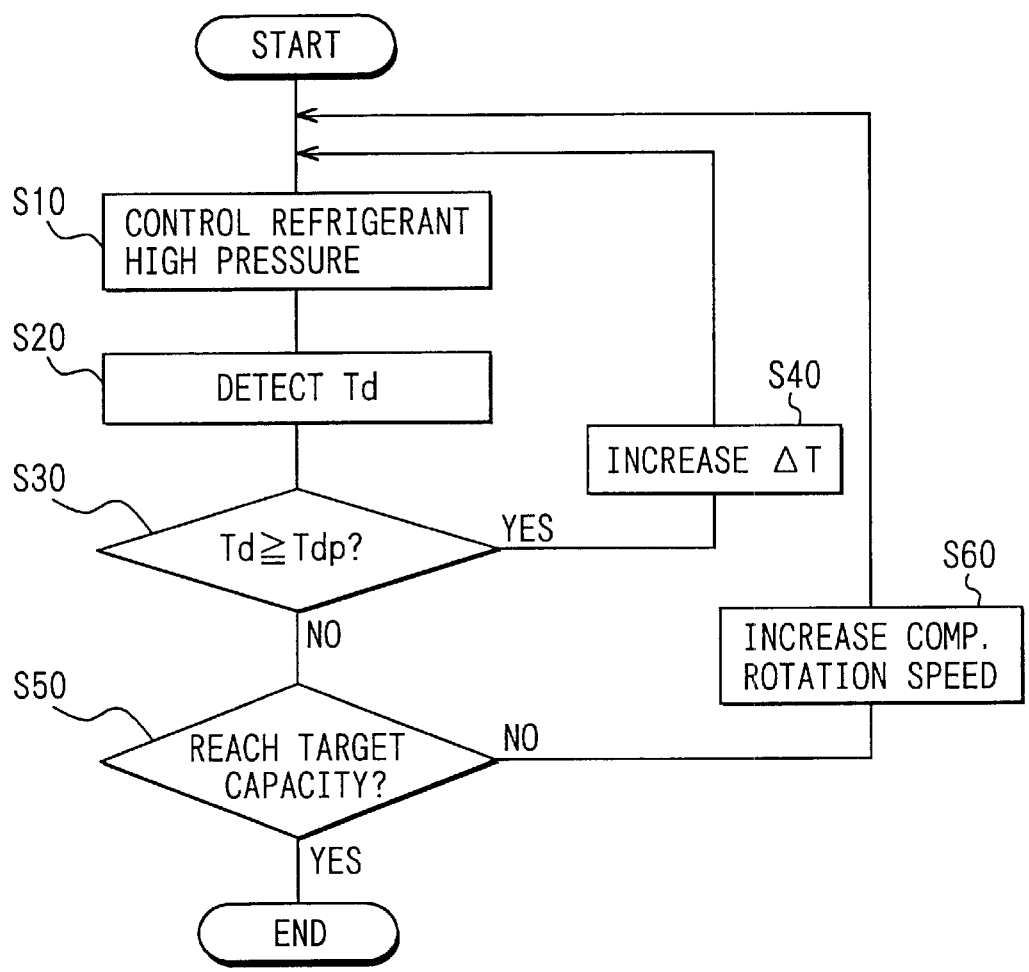
FIG. 3 is a flow diagram showing a control process of an electronic control unit (ECU) according to the first embodiment.

A first preferred embodiment of the present invention will be now described with reference to FIGS. 1–3. As shown in FIG. 1, a heat-pump water heater 1 is a hot water supply system, in which heated hot water is stored in a tank 2 and is supplied to a user after being temperature-adjusted. The heat-pump water heater 1 includes the tank 2, an electrical pump 3 forcibly circulating water in a water cycle, and a super-critical (trans-critical) heat pump cycle 4.

The tank 2 is made of a metal having a corrosion resistance, such as a stainless steel, and has a heat insulating structure so that high-temperature hot water can be stored for a long time. Hot water stored in the tank 2 can be supplied to a kitchen, a bath or the like, and can be used as a heating source for a floor heater or a room heater or the like.

The electrical pump 3, the tank 2 and a water heat exchanger 7 of the heater pump cycle 4 are connected by a water pipe 5 to form the water cycle. Therefore, water circulates between the tank 2 and the water heat exchanger 7, and water circulating amount in the water cycle can be adjusted in accordance with a rotation speed of a motor disposed in the electrical pump 3.

The super-critical heat pump cycle 4 uses carbon dioxide having a low-critical pressure as refrigerant, for example, so that a high-pressure side refrigerant pressure becomes equal to or greater than the critical pressure of carbon dioxide. As shown in FIG. 1, the heater pump cycle 4 includes a compressor 6, the water heat exchanger 7, an expansion valve 8, an air heat exchanger 9 and an accumulator 10.

The compressor 6 includes an electrical motor 6a which is driven by an inverter circuit 16. The compressor 6 compresses sucked gas refrigerant by the rotation of the electrical motor 6a, so that refrigerant discharged from the compressor 6 has the pressure equal to or greater than the critical pressure of refrigerant. The water heat exchanger 7 is disposed to perform a heat exchange between high-pressure gas refrigerant discharged from the compressor 6 and water pumped from the electrical pump 3. In the water heat exchanger 7, a flow direction of refrigerant is set opposite to a flow direction of water.

The expansion valve 8 is constructed so that a valve opening degree can be electrically adjusted. The expansion valve 8 is disposed at a downstream side of the water heat exchanger 7 in a refrigerant flow direction, and decompresses refrigerant cooled in the water heat exchanger 7 in accordance with a valve opening degree. A fan 11 for blowing air (i.e., outside air) toward the air heat exchanger 9 is disposed so that refrigerant decompressed in the expansion valve 8 is heat-exchanged with air in the air heat exchanger 9. Therefore, refrigerant is evaporated in the air heat exchanger 9 by absorbing heat from air.

Refrigerant from the air heat exchanger 9 flows into the accumulator 10 and is separated into gas refrigerant and liquid refrigerant in the accumulator 10. Only separated gas refrigerant in the accumulator 10 is sucked into the compressor 6, and surplus refrigerant in the heat pump cycle 4 is stored in the accumulator 10.

The heat-pump water heater 1 has an electrical control unit (hereinafter, referred to as ECU) 15, and plural sensors 12–14. Specifically, the plural sensors 12–14 are a first refrigerant temperature sensor 12 for detecting a temperature Td of refrigerant discharged from the compressor 6, a water temperature sensor 13 for detecting temperature Tw of water flowing into the water heat exchanger 7, and the second refrigerant temperature sensor 14 for detecting temperature Tr of refrigerant flowing out from the water heat exchanger 7. Detection signals from the sensors 12–14 are input into the ECU 15, and the ECU 15 controls operation of the heat pump cycle 4.

The ECU 15 controls a high-pressure side refrigerant pressure in the heat pump cycle 4 based on a temperature difference between water flowing into the water heat exchanger 7 and refrigerant flowing out from the water heat exchanger 7, so that the heat pump cycle 4 can be operated with a high efficiency. That is, a target temperature difference ΔT between water flowing into the water heat exchanger 7 and refrigerant flowing out from the water heat exchanger 7 is set as an index of the cycle efficiency, and the valve opening degree of the expansion valve 8 is electrically controlled so that the target temperature difference ΔT is obtained.

Next, the control process of the ECU 15 according to the first embodiment will be now described with reference to FIG. 3. First, at step S10, the high-pressure side refrigerant pressure of the heat pump cycle 4 is controlled by controlling the valve opening degree of the expansion valve 8, so that a set target temperature difference ΔT (e.g., 10° C.) is obtained. Next, at step S20, the refrigerant temperature Td discharged from the compressor 6 is detected by the first refrigerant temperature sensor 12.

At step S30, it is determined whether or not the refrigerant temperature Td discharged from the compressor 6 is equal to or higher than a predetermined value Tdp. In the first embodiment, the predetermined value Tdp is set based on a permissible upper limit temperature of the compressor 6. When it is determined that the refrigerant temperature Td discharged from the compressor 6 is equal to or higher than the predetermined value Tdp at step S30, the target temperature difference ΔT is increased at step S40. Thereafter, the control routine returns to step S10. Accordingly, the target temperature difference ΔT is gradually increased until the refrigerant temperature Td discharged from the compressor 6 becomes smaller than the predetermined value Tdp. On the other hand, when it is determined that the refrigerant temperature Td discharged from the compressor 6 is lower than the predetermined value Tdp at step S30, it is determined whether or not a water heating capacity reaches a target water heating capacity at step S50. For example, the water heating capacity can be determined based on a heat quantity of hot water that is heated by refrigerant in the water heat exchanger 7 and is stored in the tank 2. Here, the heat quantity of hot water is calculated in accordance with a hot water temperature and a hot water flow amount. Specifically, when the heat quantity transmitted into water for a predetermined time is equal to or larger than a predetermined value, it is determined that the target water heating capacity is obtained.

When it is determined that the water heating capacity reaches the target water heating capacity at step S50, the control routine is finished. On the other hand, when it is determined that the water heating capacity does not reach the target water heating capacity at step S50, the rotation speed of the motor 6a of the compressor 6 is increased for obtaining the target water heating capacity. Thereafter, the control routine moves to step S10.

According to the first embodiment of the present invention, when the refrigerant temperature Td discharged from the compressor 6 is higher than the predetermined value Tdp, the target temperature difference ΔT is changed to be increased, and therefore, the opening degree of the expansion valve 8 becomes larger. FIG. 2 shows both states of the heat pump cycle 4, before and after the valve opening degree of the expansion valve 8 becomes larger. In FIG. 2, Q' indicates a heat radiating capacity of the water heat exchanger 7 before the valve opening degree of the expansion valve 8 becomes larger, Q indicates the heat radiating capacity of the water heat exchanger 7 after the valve opening degree of the expansion valve 8 becomes larger, L' indicates a compression operation amount (i.e., consumed power) before the valve opening degree of the expansion valve 8 becomes larger, and L indicates the compression operation amount after the valve opening degree of the expansion valve 8 becomes larger. Before the valve opening degree of the expansion valve 8 becomes larger, the target temperature difference ΔT' is in a permissle range, but the refrigerant temperature Td' discharged from the compressor 6 is higher than the predetermined value Tdp. This cycle state is readily caused when the outside air temperature becomes lower and the low-pressure side refrigerant pressure of the heat pump cycle 4 becomes lower.

After the valve opening degree of the expansion valve 8 becomes larger, because the high-pressure side refrigerant pressure of the heat pump cycle 4 decreases, the compression operation amount of the compressor 6 is decreased (L'→L), and the heat radiating amount of the water heat exchanger 7 is decreased (Q'→Q). As a result, the refrigerant temperature Td discharged from the compressor 6 decreases. Until the refrigerant temperature Td discharged from the compressor 6 is decreased to the operation temperature area of the compressor 6, the target temperature difference ΔT is changed to be increased. According to the first embodiment, because the refrigerant temperature Td discharged from the compressor 6 can be decreased to be in the operation temperature area, a problem affected to the compressor 6 can be prevented.

In the above-described first embodiment, instead of the refrigerant temperature Td detected by the first refrigerant temperature sensor 12, a physical amount relative to the refrigerant temperature Td, such as an evaporation pressure, an evaporation temperature and a refrigerant pressure discharged from the compressor 6, may be used. Further, when the refrigerant temperature Td discharged from the compressor 6 is higher than the predetermined temperature Tdp, the valve opening degree of the expansion valve 8 can be directly controlled so that the refrigerant temperature Td becomes lower than the target temperature Tdp, without changing the target temperature difference ΔT or without firstly setting the target temperature difference ΔT.

A second preferred embodiment of the present invention will be now described with reference to FIGS. 4 and 5. In the second embodiment, the target temperature difference ΔT is set based on a low-pressure side refrigerant temperature (e.g., evaporation temperature Ts of refrigerant). In the second embodiment, the other parts are similar to those of the above-described first embodiment.

Figure 4:
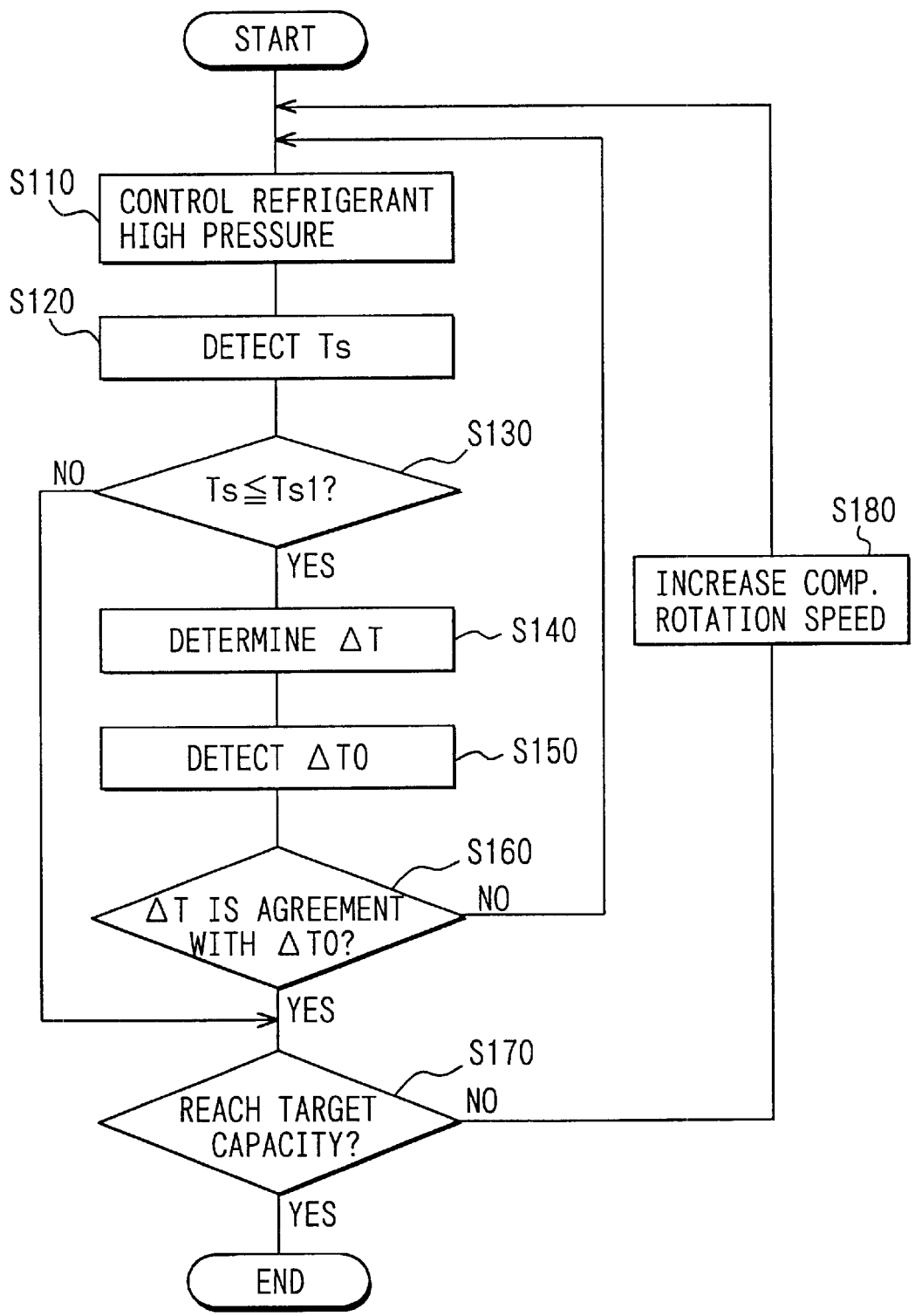
FIG. 4 is a flow diagram showing a control process of the ECU according to a second preferred embodiment of the present invention.
Figure 5:
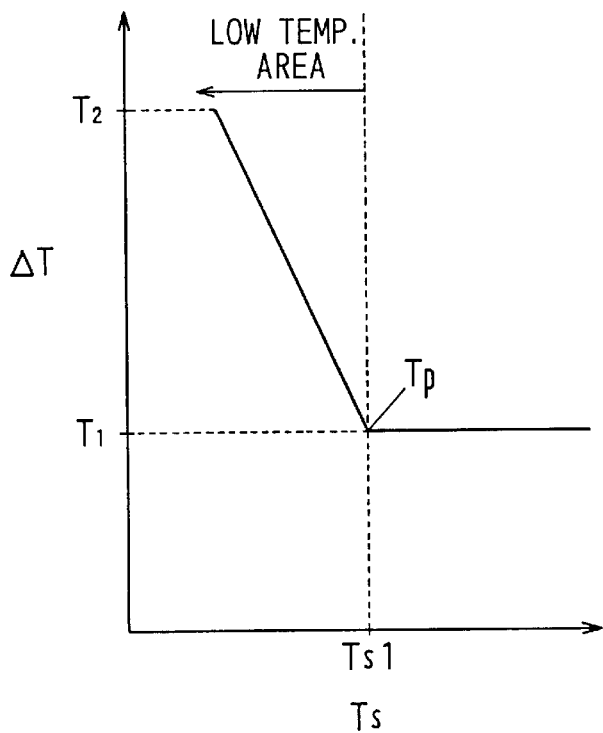
FIG. 5 is a characteristic view showing a relationship between an evaporation temperature Ts of refrigerant and a target temperature difference ΔT, according to the second embodiment.

FIG. 4 is a flow diagram showing a control process of the ECU 15 according to the second embodiment. First, at step S110, the valve opening degree of the expansion valve 8 is controlled so that a set target temperature difference ΔT can be obtained. Next, an evaporation temperature Ts of refrigerant is detected at step S120, and it is determined whether or not the evaporation temperature Ts is equal to or lower than a predetermined temperature Ts1 (i.e., protection control start temperature) at step S130. When the evaporation temperature Ts of refrigerant is equal to or lower than the predetermined temperature Ts1 at step S130, the target temperature difference ΔT is determined based on the evaporation temperature Ts of refrigerant in accordance with the graph of FIG. 5. In FIG. 5, Tp indicates a protection control start point. On the other hand, when the evaporation temperature Ts of refrigerant is higher than the predetermined temperature Ts1 at step S130, the control routine moves to step S170.

After the target temperature difference ΔT is determined at step S140, an actual temperature difference ΔT0 is detected at step S150, and the set target temperature difference ΔT is compared with the actual temperature difference ΔT0 at step S160. That is, at step S160, it is determined whether or not the set target temperature difference ΔT is agreement with the actual temperature difference ΔT0. When it is determined that the set target temperature difference ΔT is agreement with the actual temperature difference ΔT0, the control routine moves to step S170. On the other hand, when it is determined that the set target temperature difference ΔT is not agreement with the actual temperature difference ΔT0, the control routine moves to step S110.

At step S170, it is determined whether or not a water heating capacity reaches a target water heating capacity. When it is determined that the water heating capacity reaches the target water heating capacity, the control routine is finished. On the other hand, when it is determined that the water heating capacity does not reach the target water heating capacity, the rotation speed of the motor 6a of the compressor 6 is increased at step S180 for obtaining the target water heating capacity. Thereafter, the control routine moves to step S10.

According to the second embodiment of the present invention, when the refrigerant evaporation temperature Ts is lower than the predetermined temperature Ts1, the target temperature difference ΔT is set to be larger than a general control based on the refrigerant evaporation temperature Ts. Therefore, the opening degree of the expansion valve 8 becomes larger, the refrigerant pressure discharged from the compressor 6 becomes lower, and refrigerant temperature Td discharged from the compressor 6 can be decreased to the operation temperature area. As a result, it can prevent a problem affected to the compressor 6 in the heat pump cycle 4. In the second embodiment, when the refrigerant temperature Td discharged from the compressor 6 becomes lower due to a decrease of water temperature, the predetermined temperature Ts1 (protection control start temperature) may be set at a low value.

A third preferred embodiment of the present invention will be now described with reference to FIGS. 6, 7A and 7B. In the third embodiment, it is determined whether or not the load applied to the compressor 6 is excessive (i.e., larger than an upper limit value), and the target temperature difference ΔT is set larger when the load of the compressor 6 is excessive. In the third embodiment, for determining the load of the compressor 6, an operation state of a protection circuit (not shown), which restricts output current for protecting the inverter circuit 16, is detected. When the output current is restricted by the protection circuit, it is determined that the load of the compressor 6 is larger than the upper limit value. That is, in this case, it is determined that the load of the compressor 6 is excessive.

Figure 6:
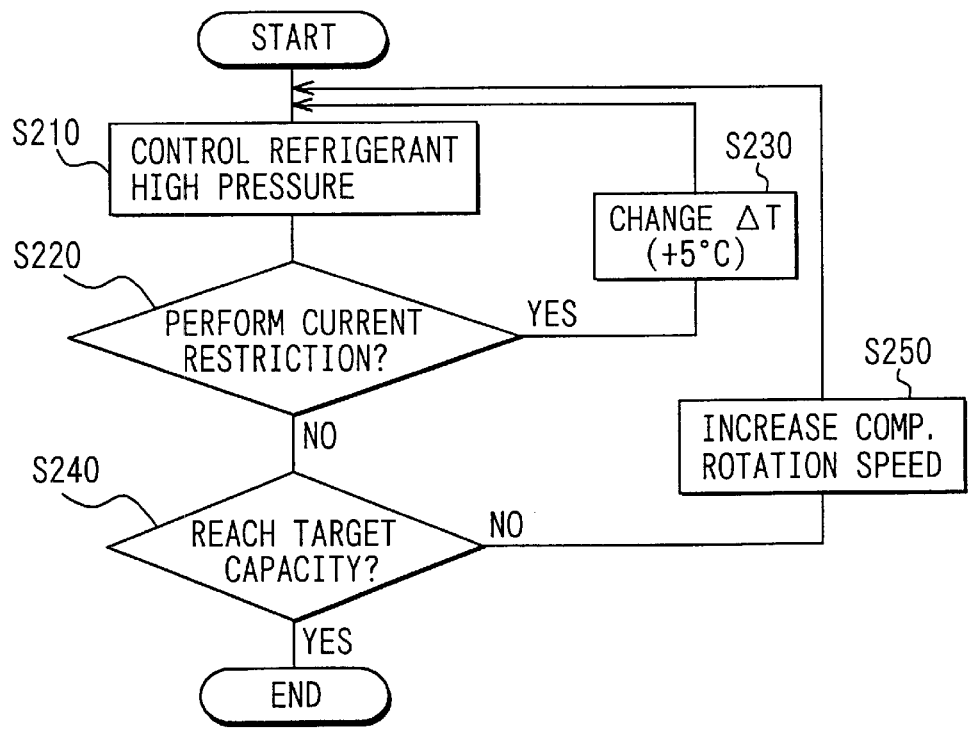
FIG. 6 is a flow diagram showing a control process of the ECU according to a third preferred embodiment of the present invention.
Figure 7B:
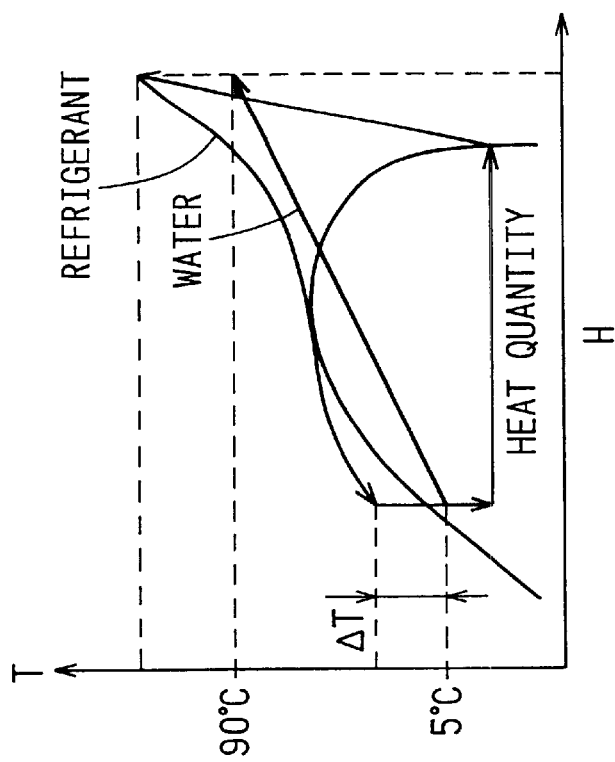
FIGS. 7A and 7B are graphs (T–H diagrams), respectively, each showing a relationship between temperature and enthalpy in a heat pump cycle using carbon dioxide as refrigerant, according to the third embodiment.

FIG. 6 is a flow diagram showing a control process of the ECU 15 according to the third embodiment. First, at Step S210, the high-pressure side refrigerant pressure of the heat pump cycle 4 is controlled by controlling the valve opening degree of the expansion valve 8, so that a set target temperature difference ΔT can be obtained. Next, at step S220, it is determined whether or not a current restriction due to the inverter circuit 16 is performed in the compressor 6. When the current restriction is performed at step S220, the target temperature difference ΔT is changed to become larger (e.g., 15° C.) at step S230, and thereafter, the control routine moves to step S210.

On the other hand, when the current restriction is not performed at step S220, it is determined whether or not a water heating capacity reaches a target water heating capacity at step S240. For example, the water heating capacity can be determined based on a heat quantity of hot water that is heated by refrigerant in the water heat exchanger 7 and is stored in the tank 2. Here, the heat quantity of hot water is calculated in accordance with a hot water temperature and a hot water flow amount. Specifically, when the heat quantity transmitted into water for a predetermined time is equal to or larger than a predetermined value, it is determined that the target water heating capacity is obtained.

When it is determined that the water heating capacity reaches the target water heating capacity, the control routine is finished. On the other hand, when it is determined that the water heating capacity does not reach the target water heating capacity, the rotation speed of the motor 6a of the compressor 6 is increased at step S250 for obtaining the target water heating capacity. Thereafter, the control routine moves to step S210.

Figure 7A:
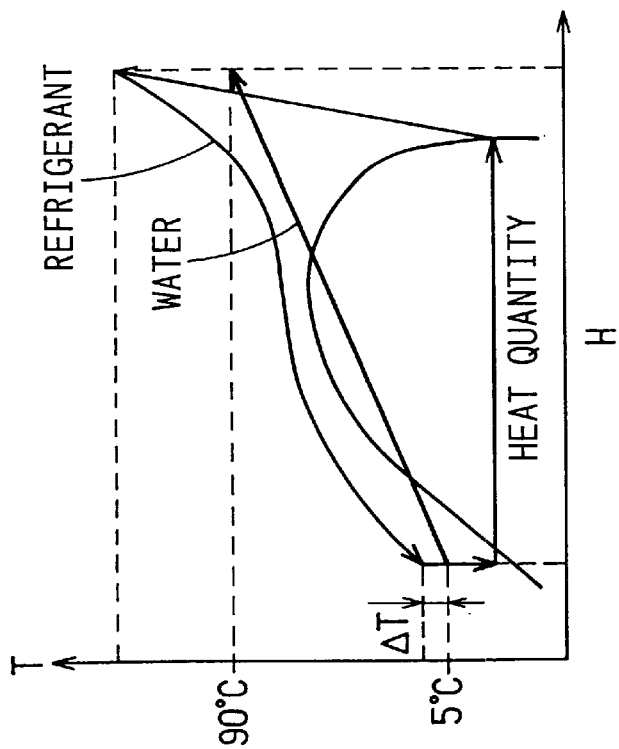

According to the third embodiment, in a normal operation of the heat pump cycle 4, as shown in FIG. 7A, the high-pressure side refrigerant pressure is controlled so that the set target temperature difference ΔT (e.g., 10° C.) can be obtained, and a suitable heat-exchanging state of the water heat exchanger 7 can be obtained. On the other hand, when the load of the compressor 6 becomes excessive due to some reason, the target temperature difference ΔT (e.g., 10° C.) is changed to be increased by a value (e.g., 5° C.) as compared with the normal operation state, as shown in FIG. 7B. Even in this case, the heat pump cycle operates with a high-pressure side refrigerant pressure lower than that in the normal operation state.

In the third embodiment, even when the current restriction due to the inverter circuit 16 is performed, the current restriction can be canceled by increasing the target temperature difference ΔT, and it can prevent the refrigerant flow amount from being decreased due to a reduce of the rotation speed of the compressor 6. As a result, a necessary water heating capacity can be obtained in the heat-pump water heater 1 without throttling the valve opening degree of the expansion valve 8 more than a necessary degree.

Although the present invention has been fully described in connection with the preferred embodiments thereof with reference to the accompanying drawings, it is to be noted that various changes and modifications will become apparent to those skilled in the art.

For example, In the above-described embodiments, the present invention is typically applied to the heat-pump water heater 1 for heating water. However, the present invention may be applied to a heat-pump fluid heater for heating a fluid using the heat pump cycle 4 as a heating source.

In the above-described first and second embodiments, the valve opening degree of the expansion valve 8 is controlled so that the set target temperature difference ΔT can be obtained. However, a water discharge amount of the electrical pump 3 may be controlled, so that the flow amount of water flowing into the water heat exchanger 7 is changed and the target temperature difference ΔT is obtained.

Figure 8:
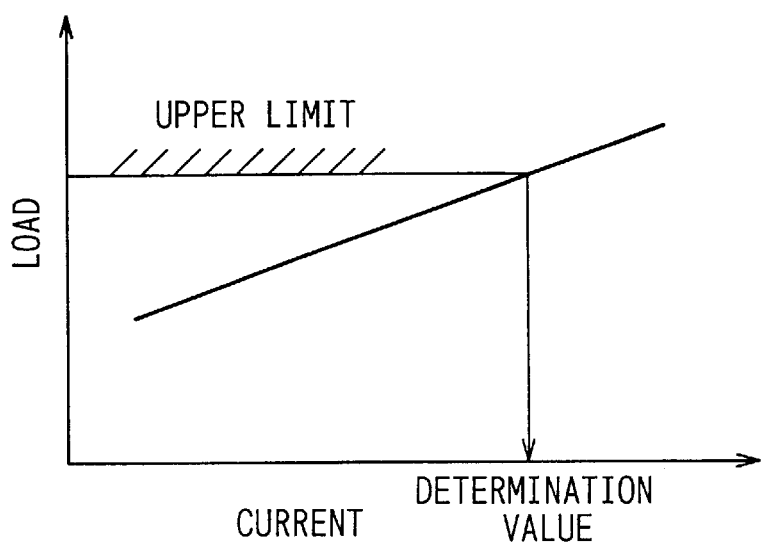
FIG. 8 is a graph showing a relationship between a driving current and a load of a compressor according to a modification of the present invention.

In the above-described third embodiment, the excessive load of the compressor 6 is determined based on the current restriction due to the inverter circuit 16. However, electrical current applied to the motor 6a of the compressor 6 from the inverter circuit 16 is detected, and the load of the compressor 6 may be determined based on the applied electrical current. For example, as shown in FIG. 8, when electrical current applied to the motor 6a is equal to or larger than a determination value, it is determined that the load of the compressor 6 is equal to or larger than a set upper limit value, and the target temperature difference ΔT is changed to be larger.

Further, the excessive load of the compressor 6 may be determined based on at least one physical amount relative to the load of the compressor, such as a target heating temperature of water, an outside air temperature and a rotation speed of the compressor 6.

Figure 9:
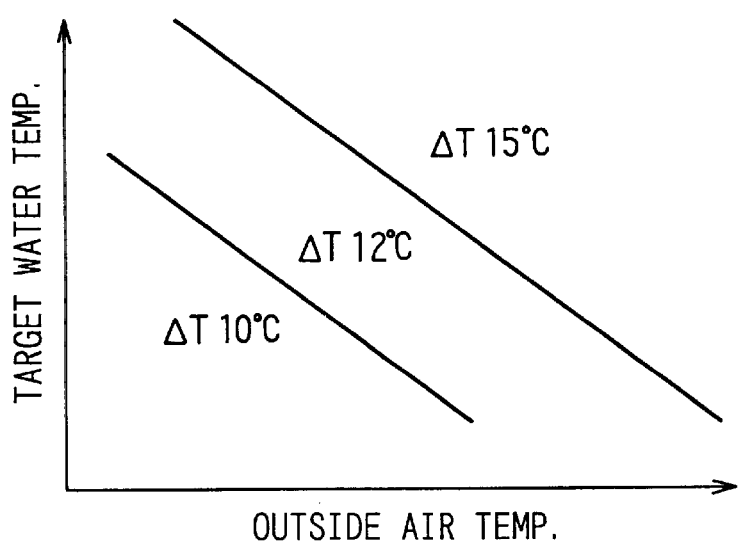
FIG. 9 is a graph showing a stepwise change of the target temperature difference ΔT according to an another modification of the present invention.

Further, in the third embodiment, when the target temperature difference ΔT is changed, the target temperature difference may be stepwise changed or may be gradually continuously changed. For example, as shown in FIG. 9, the target temperature difference ΔT can be changed stepwise based on a combination of the outside air temperature and a target water temperature to be heated. In this case, a determination range of the target temperature difference ΔT may be changed in accordance with the rotation speed of the compressor 6. That is, as the rotation speed of the compressor 6 is higher, the target temperature difference ΔT is corrected to become larger.

Such changes and modifications are to be understood as being within the scope of the present invention as defined by the appended claims.

What is claimed is:

1. A heat pump fluid heater for heating a fluid using a heat pump cycle as a heating source, comprising:
    a compressor which compresses sucked refrigerant to have a pressure equal to or higher than a critical pressure of refrigerant, and discharges compressed refrigerant;
    a heat exchanger which is disposed to perform a heat exchange between refrigerant from the compressor and the fluid, in such a manner that a flow direction of refrigerant is opposite to a flow direction of the fluid in the heat exchanger; and
    a control unit for controlling operation of the heat pump cycle, wherein:
    the control unit controls a high-pressure side refrigerant pressure from the compressor and before being decompressed in the heat pump cycle, so that a temperature difference between the fluid flowing into the heat exchanger and refrigerant discharged from the heat exchanger becomes a target temperature difference;
    the control unit has a detection member for detecting one of a refrigerant temperature and a physical amount relative to the refrigerant temperature discharged from the compressor; and
    the control unit changes the target temperature difference to be increased when a detection value of the detection member is more than a predetermined value.

2. The heat-pump fluid heater according to claim 1, wherein the control unit increases the target temperature difference until the detection value of the detection member is less than the predetermined value.

3. The heat-pump fluid heater according to claim 1, wherein:
    wherein the control unit sets the target temperature difference larger as a low-pressure side refrigerant pressure after being decompressed in the heat pump cycle becomes lower, when the low-pressure side refrigerant pressure in the heat pump cycle is lower than a predetermined pressure.

4. The heat-pump fluid heater according to claim 1, wherein:
    the detection member detects at least one of a refrigerant pressure and a refrigerant temperature sucked into the compressor; and
    a detection value of the detection member is used as the physical amount relative to the high-pressure side refrigerant pressure.

5. The heat-pump fluid heater according to claim 1, wherein:
    the detection member detects a refrigerant pressure discharged from the compressor; and
    the refrigerant pressure detected by the detection member is used as the physical amount.

6. The heat-pump fluid heater according to claim 1, wherein:
    the control unit determines whether or not a load of the compressor is excessive; and
    the control unit changes the target temperature difference to be increased to a value, when it is determined that the load of the compressor is excessive.

7. The heat-pump fluid heater according to claim 6, wherein:
    the control unit detects an electrical current applied to the compressor, and determines that the load of the compressor is excessive when the electrical current applied to the compressor is larger than a predetermined value.

8. The heat-pump fluid heater according to claim 6, further comprising
    an inverter circuit for driving the compressor, the inverter circuit having a protection circuit which restricts an output current for protecting the inverter circuit,
    wherein the control unit detects an output restriction due to the protection circuit, and determines that the load of the compressor is excessive when the output restriction due to the protection circuit is detected.

9. The heat-pump fluid heater according to claim 6, wherein the control unit determines whether the load of the compressor is excessive based on at least one condition of a target fluid temperature to be heated, an outside air temperature and a rotation speed of the compressor.

10. The heat-pump fluid heater according to claim 6, wherein
    when the control unit determines that the load of the compressor is excessive, the control unit changes any one of a target fluid temperature to be heated and the target temperature difference, in accordance with the load of the compressor.

11. The heat-pump fluid heater according to claim 1, further comprising
    an expansion valve for decompressing refrigerant, which is disposed to electrically adjust a valve opening degree,
    wherein the control unit adjusts the valve opening degree of the expansion valve based on the target temperature difference to control the high-pressure side refrigerant pressure.

12. The heat-pump fluid heater according to claim 11, wherein the control unit increases a rotation speed of the compressor to obtain a target heating capacity of the fluid, when the target temperature difference is changed to be increased.

13. The heat-pump fluid heater according to claim 1, wherein the fluid to be heated is water in a hot water supply system.

14. A heat pump fluid heater for heating a fluid using a heat pump cycle as a heating source, comprising:
    a compressor which compresses sucked refrigerant to have a pressure equal to or higher than a critical pressure of refrigerant, and discharges compressed refrigerant;
    a heat exchanger which is disposed to perform a heat exchange between refrigerant from the compressor and the fluid, in such a manner that a flow direction of refrigerant is opposite to a flow direction of the fluid in the heat exchanger; and
    a control unit for controlling operation of the heat pump cycle, wherein:
    the control unit controls a high-pressure side refrigerant pressure from the compressor and before being decompressed in the heat pump cycle, so that a temperature difference between the fluid flowing into the heat exchanger and refrigerant discharged from the heat exchanger becomes a target temperature difference;
    the control unit determines whether or not a load of the compressor is excessive; and
    the control unit changes the target temperature difference to be increased to a value, when it is determined that the load of the compressor is excessive.

15. The heat-pump fluid heater according to claim 14, wherein:

the control unit detects an electrical current applied to the compressor, and determines that the load of the compressor is excessive when the electrical current applied to the compressor is larger than a predetermined value.

16. The heat-pump fluid heater according to claim 14, further comprising an inverter circuit for driving the compressor, the inverter circuit having a protection circuit which restricts an output current for protecting the inverter circuit, wherein the control unit detects an output restriction due to the protection circuit, and determines that the load of the compressor is excessive when the output restriction due to the protection circuit is determined.

17. The heat-pump fluid heater according to claim 14, wherein the control unit determines whether the load of the compressor is excessive based on at least one condition of a target fluid temperature to be heated, an outside air temperature and a rotation speed of the compressor.

18. The heat-pump fluid heater according to claim 14, wherein when the control unit determines that the load of the compressor is excessive, the control unit changes stepwise any one of a target fluid temperature to be heated and the target temperature difference in accordance with the load of the compressor.

19. The heat-pump fluid heater according to claim 14, wherein when the control unit determines that the load of the compressor is excessive, the control unit changes continuously any one of a target fluid temperature to be heated and the target temperature difference in accordance with the load of the compressor.

20. A heat pump fluid heater for heating a fluid using a heat pump cycle as a heating source, comprising:

a compressor which compresses sucked refrigerant to have a pressure equal to or higher than a critical pressure of refrigerant, and discharges compressed refrigerant;

a heat exchanger which is disposed to perform a heat exchange between refrigerant from the compressor and the fluid, in such a manner that a flow direction of refrigerant is opposite to a flow direction of the fluid in the heat exchanger; and a control unit for controlling operation of the heat pump cycle, wherein:

the control unit has a temperature detection sensor for detecting a refrigerant temperature discharged from the compressor;

the control unit controls a high-pressure side refrigerant pressure from the compressor and before being decompressed in the heat pump cycle, so that a temperature difference between the fluid flowing into the heat exchanger and refrigerant discharged from the heat exchanger becomes a target temperature difference when the refrigerant temperature detected by the temperature sensor is lower than a predetermined temperature; and when the refrigerant temperature detected by the temperature sensor is higher than the predetermined temperature, the control unit controls the high-pressure side refrigerant pressure of the heat pump cycle so that the refrigerant temperature detected by the temperature sensor becomes lower than the predetermined temperature.

* * * * *